United States Patent [19]
Campion et al.

[11] Patent Number: 6,007,786
[45] Date of Patent: Dec. 28, 1999

[54] DEVICE FOR DOPING SILICA POWDER

[75] Inventors: Jean-Florent Campion, Bois Colombes; Bernard Jouvenel, Lille; Laurent Gasca, Orsay, all of France

[73] Assignee: Alcatel Fibres Optiques, Bezons Cedex, France

[21] Appl. No.: 08/862,172

[22] Filed: May 20, 1997

[30] Foreign Application Priority Data

May 21, 1996 [FR] France .................................. 96 06272

[51] Int. Cl.$^6$ ............................... B01J 8/00; C03B 19/06
[52] U.S. Cl. .......................... 422/189; 422/197; 422/198; 422/199; 422/209; 422/250.1; 65/144; 65/157
[58] Field of Search ................................. 422/189, 199, 422/196, 197, 198, 194, 216, 245.1, 250.1, 254, 209; 65/494, 502, 508, 529, 144, 157

[56] References Cited

U.S. PATENT DOCUMENTS 5,131,936  7/1992  Cognolato et al. ........................ 65/144

FOREIGN PATENT DOCUMENTS

0578553A1  1/1994  European Pat. Off. .

OTHER PUBLICATIONS

Database WPI, Week 8737, Derwent Publications Ltd., London, GB, corresponding to JP 62 182 127 A (Nippon Teleg & Teleph) dated Aug. 10, 1987.

*Primary Examiner*—Hien Tran
*Attorney, Agent, or Firm*—Sughrue, Mion, Zinn, Macpeak & Seas, PLLC

[57] ABSTRACT

A device for doping silica powder with a dopant includes an arrangement for receiving silica soot particles or previously fabricated silica granules. The particles or granules contained in the receiving arrangement are heated to a temperature sufficient to allow agglomeration of the soot particles into granules followed by densification of the granules. The receiving arrangement is fed with a precursor gas of the dopant so that the granules are heated in an atmosphere containing the precursor gas, which causes the dopant to be incorporated into the granules during their densification to produce densified and doped silica grains. The receiving arrangement is mobile so that, during their movement, each of the granules that it contains is subject to movement such that substantially all of its outside surface is exposed to the atmosphere containing the precursor gas.

17 Claims, 4 Drawing Sheets

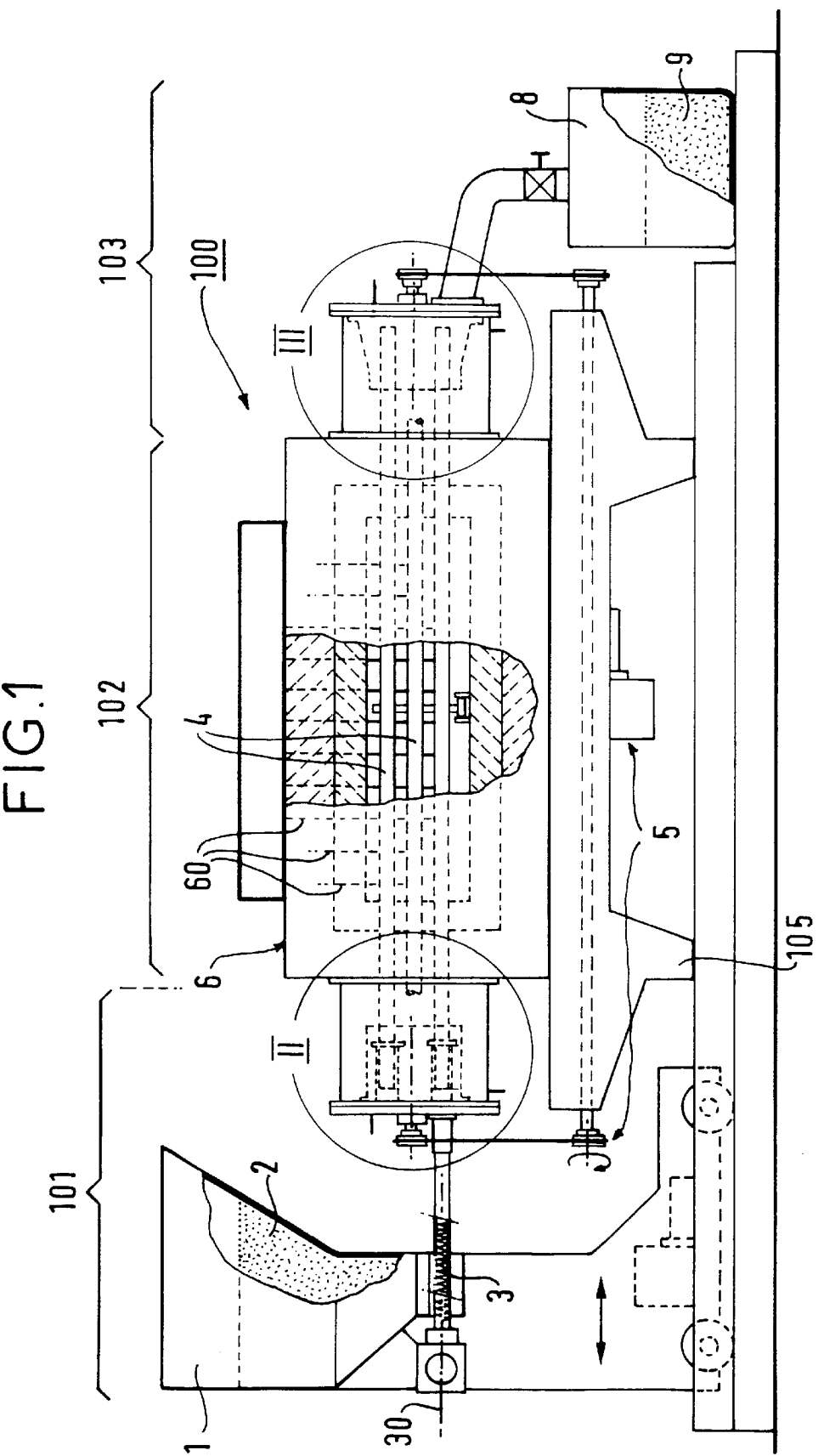

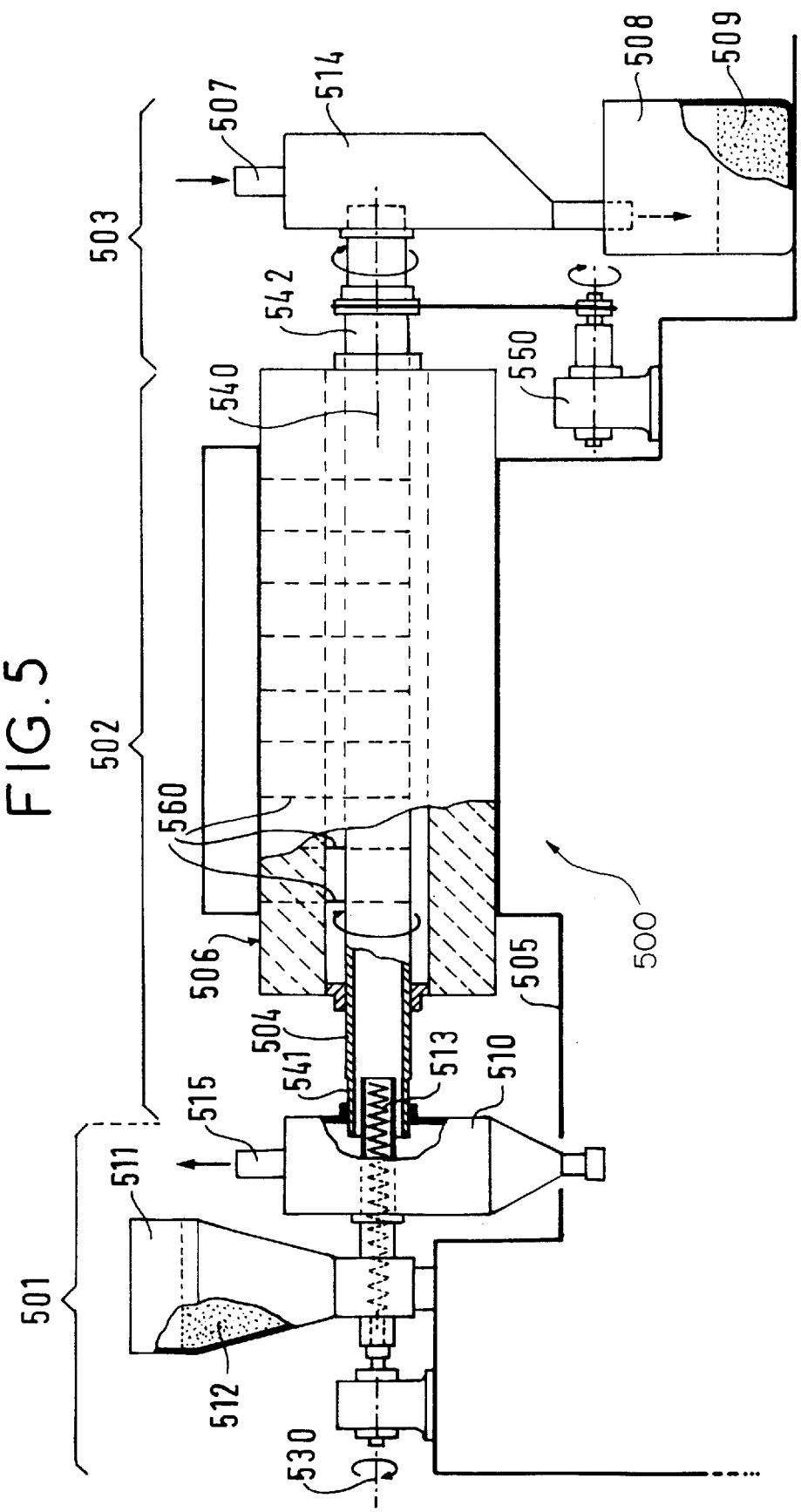

DEVICE FOR DOPING SILICA POWDER

BACKGROUND OF THE INVENTION

1. Field of the Invention

The present invention concerns a device for doping silica powder. Generally speaking, the powders obtained with a device of the invention will be usable in any type of application, and more particularly for the fabrication of optical fiber preforms.

2. Description of the Prior Art

Doping is an operation which consists of incorporating into the silica molecules one or more molecules of elements intended to modify their properties. For example, in the field of optical fibers, dopants are incorporated into the silica to modify its refractive index, respectively increasing it or reducing it according to whether the silica concerned is to form the core or the optical cladding of an optical fiber, for example. The dopant can be germanium to increase the refractive index of the silica or fluorine to reduce it, for example.

Silica ready for use in the fabrication of optical fibers is in the form of a powder made up of grains of greater or lesser size, and possibly densified.

For example, densified silica grains are used for plasma coating of an optical fiber preform fabricated by the modified chemical vapor deposition (MCVD) process.

Silica grains that have not been densified are usually smaller in size than densified silica grains and can be used to fabricate a preform by the vapor axial deposition (VAD) or outside vapor deposition (OVD) process, for example.

All the above processes are mentioned merely by way of example. The invention is in no way limited to these methods, which are well known to the skilled person in the field of optical fibers and will not be described in more detail here.

The fabrication of densified silica grains begins with non-densified silica grains in the form of very small particles, generally with a size between 0.1 nm and 100 nm. In this form the silica powder is called soot. The silica soot can be obtained in various ways well known to the skilled person. For example, it can be made by oxidizing in the presence of heat a silica precursor gas, such as silicon tetrachloride $SiCl_4$. To fabricate densified silica grains the small silica particles are agglomerated to form granules and these granules are then consolidated by heating them to eliminate the pores between the particles constituting them, with the result that the grains obtained in this way are dense. These grains generally have a size in excess of one micron.

The expression "silica granule" refers to a silica particle at an intermediate stage of the process of fabricating densified silica grains.

The conventional method used to obtain a powder made up of doped silica grains consists in carrying out the operation of densifying the granules in an atmosphere containing a precursor gas of the required dopant. For example, to fluorinate silica granules densification is carried out in an atmosphere containing a fluorine-containing gas such as sulfur hexafluoride $SF_6$ or silicon tetrafluoride $SiF_4$. The non-densified silica granules are placed in a crucible that is placed in a furnace to heat it to the temperature at which densification can be effected, the furnace being fed with a precursor gas of the required dopant. The doping is produced by $F_2$ dopant molecules diffusing into the silica granules, which leads to the formation of complex molecules of the $SiO_{2-x}F_{2x}$ type.

Crucible type devices for implementing this type of process are subject to a number of problems.

The main problem is that, to obtain homogeneous doping, the treatment time required is very long and the doping yield is mediocre, which represents a penalty. If the treatment time is reduced, which increases the yield, the doping is not homogeneous. Non-homogeneous doping of silica grains leads, in the application to the fabrication of optical fibers, for example, to index variations that result in unacceptable transmission performance of the optical fibers.

Another serious problem is that the doping is effected in a static manner and therefore requires a first phase in which the temperature is raised in the furnace, a second phase of treatment at substantially constant temperature and a final phase in which the temperature is reduced before the doped and densified grains can be recovered. This means that the process cannot be continuous, which also represents a penalty in terms of the yield.

One aim of the present invention is to develop a device for doping silica powder that is capable of homogeneous doping, compatible with the use of the silica in the fabrication of optical fibers and without any penalty in terms of the yield of the doping operation.

Another aim of the present invention is to develop a device for doping silica powder enabling continuous doping.

SUMMARY OF THE INVENTION

To this end the present invention proposes a device for doping silica powder with a dopant, including:

silica soot particle receiving means, means for heating the particles contained in the receiving means to a temperature sufficient to allow agglomeration of the soot particles into granules followed by densification of the granules, and means for feeding the receiving means with a precursor gas of the dopant so that the granules are heated in an atmosphere containing the precursor gas, which causes the dopant to be incorporated into the granules during their densification to produce densified and doped silica grains, wherein the receiving means are mobile so that, during their movement, each of the granules that they contain is subject to movement such that substantially all of its outside surface is exposed to the atmosphere containing the precursor gas.

The present invention also proposes a device for doping silica powder with a dopant, including:

means for receiving previously fabricated silica granules, means for heating the granules contained in the receiving means to a temperature sufficient to allow densification of the granules, and means for feeding the receiving means with a precursor gas of the dopant so that the granules are heated in an atmosphere containing the precursor gas, which causes the dopant to be incorporated into the granules during their densification to produce densified and doped silica grains, wherein the receiving means are mobile so that, during their movement, each of the granules that they contain is subject to movement such that substantially all of its outside surface is exposed to the atmosphere containing the precursor gas.

Using the device of the invention, because the granules are in motion during densification, all the granules are subjected to the action of the dopant precursor gas, regardless of their size and their initial condition in the receiving means. There are therefore no longer any granules that are difficult and slow to reach. The doping is homogeneous without the yield of the doping operation being penalized.

The receiving means can advantageously rotate. This causes the granules to roll on their surface so that they are even better exposed to the action of the precursor gas. This is facilitated if the receiving means are substantially tubular in shape.

In accordance with another feature of the invention, the receiving means have a silica soot particle or silica granule inlet and a consolidated and doped silica grain outlet, the inlet being separate from the outlet. In combination with the motion of the granules, this enables continuous treatment.

Moreover, the receiving means can be disposed so that the granules are entrained or drawn by gravity from the inlet to the outlet. For example, the receiving means can be inclined to the horizontal. This further improves the exposure of all of the surface of the granules to the atmosphere containing the precursor gas.

Finally, the precursor gas can be introduced into the receiving means in a counterflow arrangement with the granules, which further improves the homogeneity of doping.

If the dopant is fluorine, the precursor gas is selected from sulfur hexafluoride $SF_6$, silicon tetrafluoride $SiF_4$ and freon.

If the dopant is chlorine, the precursor gas is selected from hydrochloric acid HCl, chlorine gas $Cl_2$ and $SOCl_2$.

Combined chlorine-fluorine doping can be effected by mixing the preceding gases.

Other features and advantages of the present invention will emerge from the following description of a device in accordance with the invention given by way of illustrative and non-limiting example.

BRIEF DESCRIPTION OF THE DRAWINGS

FIG. 1 is a diagram showing a first embodiment of a device of the invention, partly in longitudinal section.

FIG. 5 is a diagram showing a second embodiment of a device of the invention, partly in longitudinal section.

DETAILED DESCRIPTION OF THE PREFERRED EMBODIMENTS

The same components are identified by the same reference numbers in all the figures.

Figure 3:
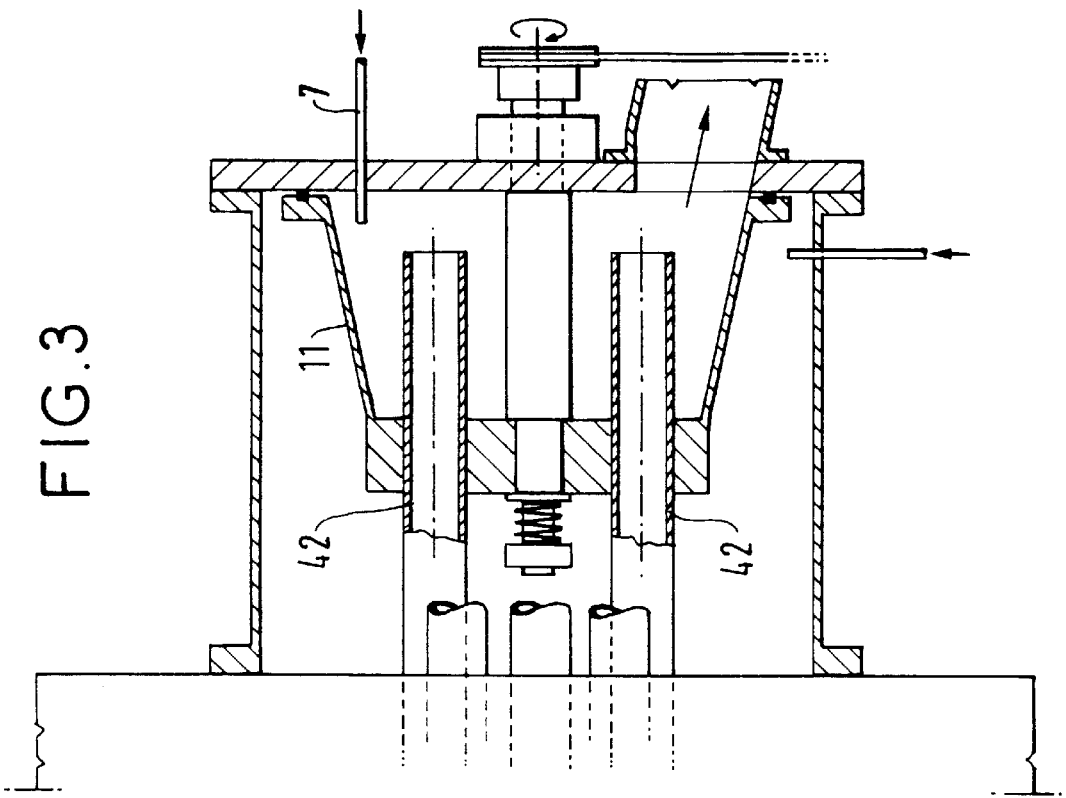
FIG. 3 shows the detail III of FIG. 1 to a larger scale.
Figure 2:
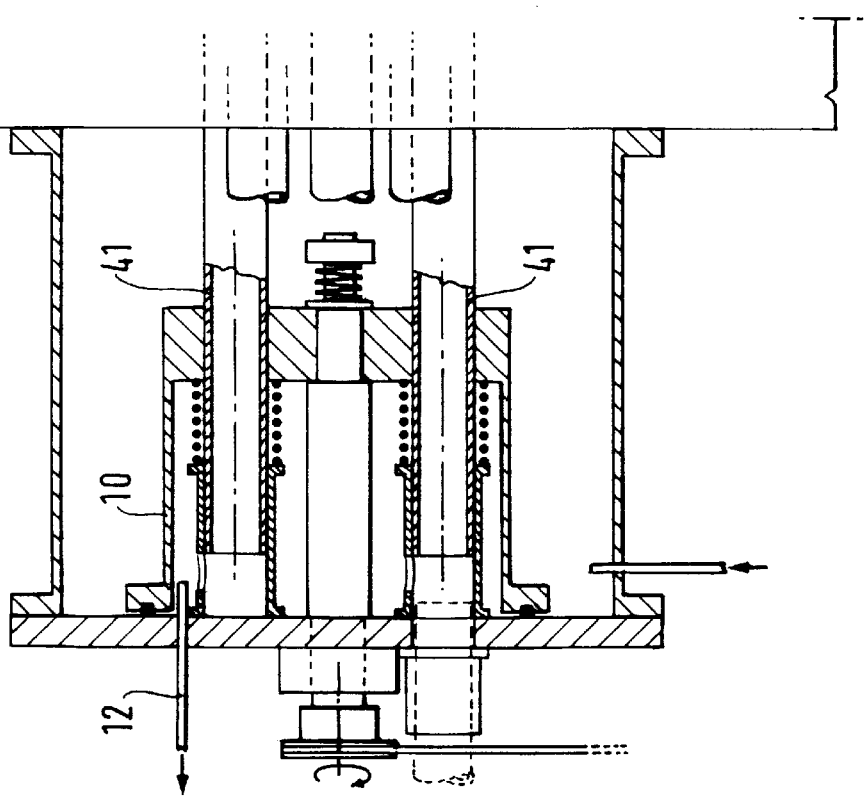
FIG. 2 shows the detail II of FIG. 1 to a larger scale.
Figure 4:
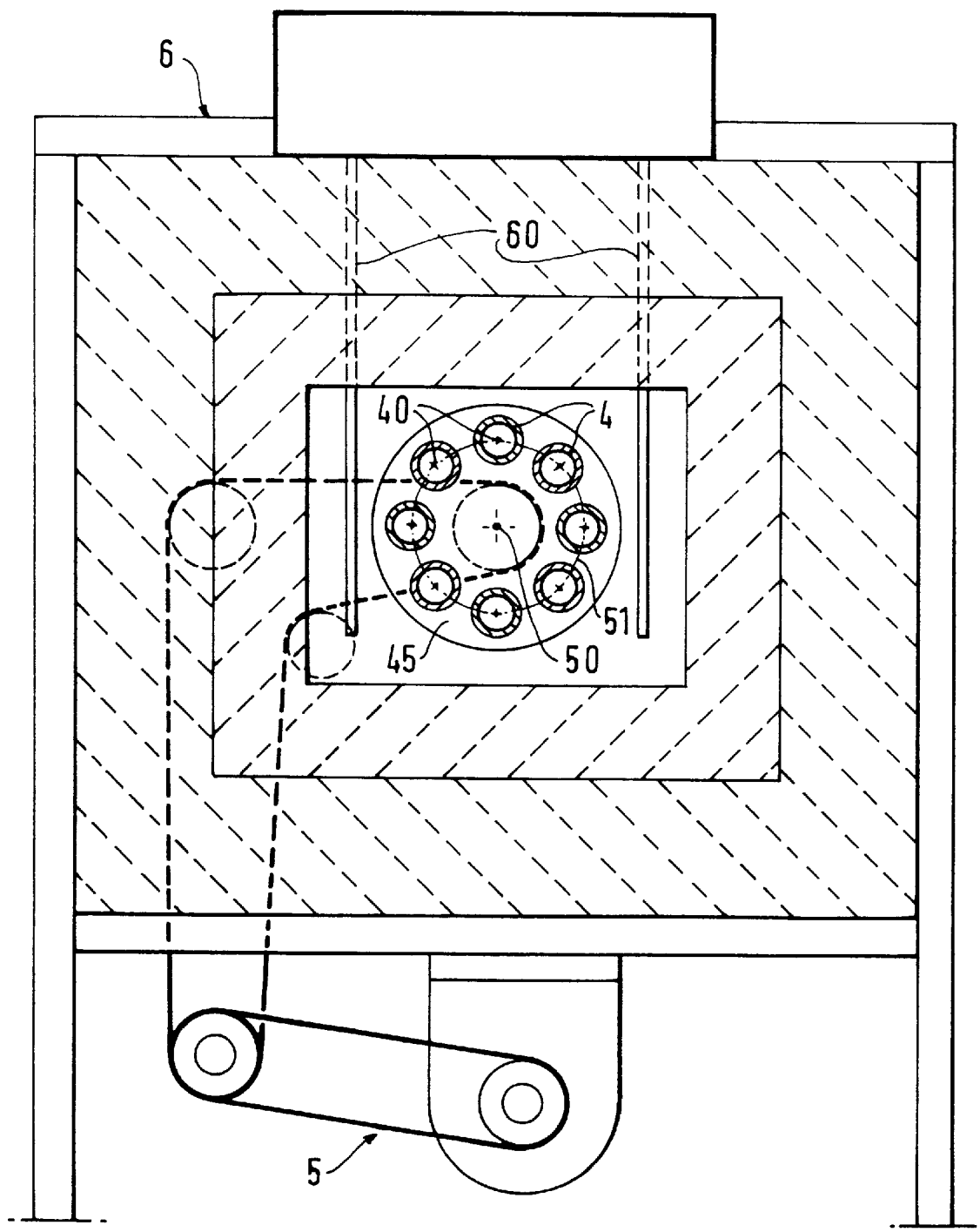
FIG. 4 is a fragmentary cross-sectional view of the main body of the device from FIG. 1.

A first embodiment 100 of a device in accordance with the invention, shown in FIGS. 1 through 4, has three parts: a part 101 for feeding previously fabricated silica soot powder or silica grains, a part 103 for recovering doped and densified silica grains and a main body 102 between them for carrying out the operations of agglomeration (when starting with silica soot), doping and densification of the silica soot powder. The feed part 101 is to the left of the main body 102 in FIG. 1 and the recovery part 103 is to its right.

The silica soot powder or silica granules feed part 101 includes a container 1 containing the soot or the silica granules 2 connected to distribution means for the silica soot or granules, for example a helical screw 3 rotating about its axis 30 in order to assure uniform distribution of the silica soot or granules 2.

The main body 102 of the device 100 is mounted on a frame 105 and includes a set of parallel tubes 4, made of alumina, for example, the axes 40 of which define a cylinder 51 (see FIG. 4), and serving as means for receiving the silica soot or granules 2, the axes 40 of the tubes 4 being parallel to the axis 30. The set of tubes 4 is mounted in a support 45 in order to be rotated about a common axis 50 which is that of the cylinder 51 and parallel to the axes 30 and 40, by rotational drive means 5 carried by the frame 105. Because of this rotation, one end 41 (see FIG. 2) of each of the tubes 4 is successively in communication with the distribution means 3. This feeds the silica soot or granules 2 into the receiving tubes 4.

Note that the ends 41 of the tubes 4 all open into a closed enclosure 10 into which the feed means 3 also open.

Over a major part of their length the tubes 4 are surrounded by a furnace 6 carried by the frame 105, having at each end along the axis 50 an opening (no reference number) through which the tubes 4 pass and in which they rotate together, and into which penetrate heating electrodes 60 for heating the receiving tubes 4. The ends 41 of the tubes 4 are outside the furnace 6, in the feed part 101 of the device 100, and the ends 42 of the tubes 4 (see FIG. 3) opposite the ends 41 are also outside the furnace 6, in the recovery part 103 of the device 100.

The recovery part 103 of the device 100 includes means 7 for feeding a precursor gas of a dopant with which the silica is to be doped. This can be a fluorine-containing gas such as sulfur hexafluoride $SF_6$ or silicon tetrafluoride $SiF_4$, for example. The feed means 7 open into a closed enclosure 11 into which the ends 42 of the tubes 4 also open, with the result that the latter are all fed with precursor gas. The precursor gas of the dopant is therefore injected in a counterflow arrangement relative to the silica granules, which assures more homogeneous doping than it if the gas were to flow in the same direction as the silica granules.

The bottom part of the enclosure 11 also communicates with a container 8 for recovering doped and densified silica grains 9 in the recovery part 103 of the device 100.

The gaseous reaction products of the doping reaction escape from the device 100 via the end 41 of the tubes 4 in the feed part 101 of the latter and then via evacuation means 12 that communicate with the enclosure 10.

The operation of the device 100 in accordance with the invention for doping silica soot 2 will now be described.

The non-densified silica soot 2 is introduced into the device 100 via the end 41 of the receiving tubes 4, in which it is heated by the furnace 6. Simultaneously, the precursor gas of the required dopant (fluorine in this example) is introduced into the device via the feed means 7 and the end 42 of the receiving tubes 4.

Heating is carried out at a high temperature, typically around 1 350° C. in the case of doping with fluorine. The very fine particles constituting the silica soot 2 therefore agglomerate to form porous silica granules incorporating the dopant from the precursor gas and the doped granules simultaneously consolidate to form densified and doped silica grains 9 that are recovered in the container 8.

By rotating the assembly of tubes 4 around the axis 50 during this process, the silica granules are caused to move against the inside surface of the tube 4, with the result that all their surface is exposed to the action of the dopant gas.

Accordingly, using the device of the invention, all the silica grains are doped homogeneously, which is not the case with the prior art devices. Moreover, all of the silica granules are exposed virtually simultaneously to the action of the dopant gas, with the result that the yield of the process is enhanced compared to processes using the static devices of the prior art.

Because the receiving tubes rotate, the granules roll on their inside surface, which facilitates the treatment. Nevertheless, in accordance with the invention, any geometry can be selected for the surface of the receiving means, together with any type of drive movement, provided that all of the surface of each granule is exposed to the action of the dopant gas.

There will now be described, with reference to FIG. 5, a second 500 embodiment of a device in accordance with the present invention.

The device 500 is also in three parts: a silica soot powder feed part 501, a densified and doped silica grain recovery part 503 and, between then, a main body 502 carrying out the operations of agglomeration, doping and densification of the silica soot powder. The feed part 501 is to the left of the main body 502 in FIG. 5 and the recovery part 503 is to its right.

The silica soot powder feed part 501 includes a container 511 containing silica soot 512 and connected to silica soot distribution means, for example a helical screw 513 rotating about its axis 530 to assure uniform distribution of the silica soot 512.

The main body 502 of the device 500 is mounted on a frame 505 and includes a tube 504, made of alumina, for example, providing means for receiving the silica soot 512, the axis 540 of the tube 504 being coincident with the axis 530. The tube 504 is rotated about its axis 540 by rotational drive means 550 carried by the frame 505. One end 541 of the tube 504 communicates with the distribution means 513. In this way the silica soot 512 is introduced into the receiving tube 504.

Note that the end 541 of the tube 504 opens into a closed enclosure 510 into which the feed means 513 also open.

The major part of the length of the tube 504 is surrounded by a furnace 506 carried by the frame 505, having at each end along the axis 540 an opening (no reference number) through which the tube 504 passes and in which it rotates, and into which penetrate heating electrodes 560 for heating the receiving tube 504. The end 541 of the tube 504 is outside the furnace 506, in the feed part 501 of the device 500, and the end 542 of the tube 504 opposite the end 541 is also outside the furnace 506, in the recovery part 503 of the device 500.

The recovery part 503 of the device 500 includes feed means 507 for a precursor gas of a dopant with which the silica is to be doped. This can be a fluorine-containing gas such as sulfur hexafluoride $SF_6$ or silicon tetrafluoride $SiF_4$, for example. The feed means 507 open into a closed enclosure 514 into which the end 542 of the tube 504 also opens, so that the latter is therefore fed with precursor gas. Accordingly, the precursor gas of the required dopant is injected in a counterflow arrangement relative to the silica soot 512, which assures homogeneous doping.

The bottom part of the enclosure 514 also communicates with a container 508 for recovering doped and densified silica grains 509, in the recovery part 503 of the device 500.

The gaseous reaction products of the doping reaction escape from the device 500 via the end 541 of the tube 504 in the feed part 501 of the latter and then via evacuation means 515 that communicate with the enclosure 510.

The operation of the device 500 of the invention for doping the silica soot 512 is similar to the operation of the device 100 from FIGS. 1 through 4 for doping the silica soot 2. The advantages of the device 500 are the same as those of the device 100.

The operation of the devices 100 and 500 of the invention for doping previously fabricated silica granules 2 is identical to the operation as described hereinabove except that there is no agglomeration since the granules are fabricated beforehand.

The present invention is obviously not limited to the embodiments that have just been described. In particular, the homogeneity of the doped silica grains obtained can be further enhanced if the device 100 or the device 500, or at least their main body 102 or 502, is inclined downwardly to the horizontal at an angle in the order of 3° to 5°, for example, between the silica soot inlet and the doped grains outlet.

In the embodiments described, the inlet and the outlet are separate, but this is not mandatory. However, separating the inlet and the outlet allows doping continuously with the fabrication of an optical fiber preform, for example, by connecting the densified and doped silica grains outlet to the silica distributor associated with a device for fabricating a preform of this kind.

The receiving tube or tubes can be made of any abrasion resistant material that resists the action of compounds of carbon, fluorine and any other dopant with which it may be required to dope the silica.

The temperature to which the silica granules or soot introduced into the device of the invention are heated must be chosen to suit the flowrate of the precursor gas, among other things. The treatment time depends on the speed at which the granules move in the receiving means, which is in turn dependent on the inclination of the receiving means.

Finally, any means as described may be replaced by equivalent means without departing from the scope of the invention.

There is claimed:

1. A device for doping silica powder with a dopant, including:

silica soot particle receiving means, said receiving means having an opening through which silica soot particles enter from outside said receiving means into an interior of said receiving means, means for heating the soot particles contained in said receiving means to a temperature sufficient to allow agglomeration of the soot particles into granules and followed by densification of the granules, and means for feeding said receiving means with a precursor gas of the dopant so that the granules are heated in an atmosphere containing the precursor gas, which causes the dopant to be incorporated into the granules during densification of the granules to produce densified and doped silica grains, wherein said receiving means is mobile so that during its movement, each of the granules contained therein is subjected to movement against the inside surface of said receiving means such that substantially all of an outside surface of the granules is exposed to the atmosphere containing the precursor gas.

2. A device for doping silica powder with a dopant, including:

fabricated silica granules receiving means, said receiving means having an opening through which silica granules enter from outside said receiving means into an interior of said receiving means, means for heating the granules contained in said receiving means to a temperature sufficient to allow densification of the granules, and means for feeding said receiving means with a precursor gas of the dopant so that the granules are heated in an atmosphere containing the precursor gas, which causes the dopant to be incorporated into the granules densification of the granules to produce densified and doped silica grains, wherein said receiving means is mobile so that during its movement, each of the granules contained therein is subjected to movement against the inside surface of said receiving means such that substantially all of an outside surface of the granules is exposed to the atmosphere containing the precursor gas.

3. The device claimed in claim 1 or claim 2 wherein said receiving means is subjected to a rotational movement.

4. The device claimed in claim 1 or claim 2 wherein said receiving means is substantially tubular.

5. The device claimed in claim 1 or claim 2 wherein said receiving means has a silica soot particle or silica granule inlet and a consolidated and doped silica grain outlet, said inlet being separate from said outlet.

6. The device claimed in claim 5 wherein said receiving means is disposed so that the granules are drawn by gravity from said inlet to said outlet.

7. The device claimed in claim 5 wherein said receiving means is inclined to the horizontal.

8. The device claimed in claim 1 or claim 2 wherein said feeding means is disposed so that the precursor gas is introduced into said receiving means in a counterflow arrangement relative to the granules.

9. A device for doping silica powder with a dopant, including:

means for receiving silica soot particles, means for heating the particles contained in said receiving means to a temperature sufficient to allow agglomeration of the soot particles into granules and followed by densification of the granules, and means for feeding said receiving means with a precursor gas of the dopant so that the granules are heated in an atmosphere containing the precursor gas, which causes the dopant to be incorporated into the granules during densification of the granules to produce densified and doped silica grains, wherein said receiving means is mobile so that during its movement, each of the granules contained therein is subjected to movement against the inside surface of said receiving means such that substantially all of an outside surface of the granules is exposed to the atmosphere containing the precursor gas, wherein said receiving means has a silica soot particle inlet and a consolidated and doped silica grain outlet, said inlet being separate from said outlet, and wherein said receiving means is disposed so that the granules are drawn by gravity from said inlet to said outlet.

10. A device for doping silica powder with a dopant, including:

means for receiving silica soot particles, means for heating the particles contained in said receiving means to a temperature sufficient to allow agglomeration of the soot particles into granules and followed by densification of the granules, and means for feeding said receiving means with a precursor gas of the dopant so that the granules are heated in an atmosphere containing the precursor gas, which causes the dopant to be incorporated into the granules during densification of the granules to produce densified and doped silica grains, wherein said receiving means is mobile so that during its movement, each of the granules contained therein is subjected to movement against the inside surface of said receiving means such that substantially all of an outside surface of the granules is exposed to the atmosphere containing the precursor gas, wherein said receiving means has a silica soot particle inlet and a consolidated and doped silica grain outlet, said inlet being separate from said outlet, and wherein said receiving means is inclined to the horizontal.

11. A device for doping silica powder with a dopant, including:

means for receiving previously fabricated silica granules, means for heating the granules contained in said receiving means to a temperature sufficient to allow densification of the granules, and means for feeding said receiving means with a precursor gas of the dopant so that the granules are heated in an atmosphere containing the precursor gas, which causes the dopant to be incorporated into the granules during densification to produce densified and doped silica grains, wherein said receiving means is mobile so that, during its movement, each of the granules contained therein is subjected to movement against the inside surface of said receiving means such that substantially all of an outside surface of the granules is exposed to the atmosphere containing the precursor gas, wherein said receiving means has a silica granule inlet and a consolidated and doped silica grain outlet, said inlet being separate from said outlet, and wherein said receiving means is disposed so that the granules are drawn by gravity from said inlet to said outlet.

12. A device for doping silica powder with a dopant, including:

means for receiving previously fabricated silica granules, means for heating the granules contained in said receiving means to a temperature sufficient to allow densification of the granules, and means for feeding said receiving means with a precursor gas of the dopant so that the granules are heated in an atmosphere containing the precursor gas, which causes the dopant to be incorporated into the granules during densification to produce densified and doped silica grains, wherein said receiving means is mobile so that, during its movement, each of the granules contained therein is subjected to movement against the inside surface of said receiving means such that substantially all of an outside surface of the granules is exposed to the atmosphere containing the precursor gas, wherein said receiving means has a silica granule inlet and a consolidated and doped silica grain outlet, said inlet being separate from said outlet, and wherein said receiving means is inclined to the horizontal.

13. A device for doping silica with a dopant, comprising:

at least one tube, said at least one tube having an opening through which silica enters from outside said at least one tube into an interior of said at least one tube, a heater surrounding said at least one tube to provide heat for densification of the silica, and an inlet for feeding said at least one tube with a precursor gas of the dopant so that the silica is heated in an atmosphere containing the precursor gas, which causes the dopant to be incorporated into the silica during densification to produce densified and doped silica grains, wherein said tube is subjected to movement so that, during its movement, each of the granules contained therein is subjected to movement against the inside surface of said tube such that substantially all of an outside surface of the granules is exposed to the atmosphere containing the precursor gas.

14. The device for doping silica with a dopant of claim 13, wherein the silica is delivered from an external container.

15. The device for doping silica with a dopant of claim 13, wherein the silica is drawn by gravity through said at least one tube.

16. The device for doping silica with a dopant of claim 13, wherein said at least one tube is inclined to the horizontal.

17. The device for doping silica with a dopant of claim 13, wherein said inlet is disposed so that the precursor gas is introduced into said at least one tube in a counterflow arrangement relative to the silica.

* * * * *